(12) United States Patent
Abbate et al.

(10) Patent No.: US 9,332,010 B2
(45) Date of Patent: May 3, 2016

(54) METHODS AND SYSTEMS FOR TOKEN-BASED APPLICATION MANAGEMENT

(71) Applicant: MOTOROLA SOLUTIONS, INC, Schaumburg, IL (US)

(72) Inventors: Alain D Abbate, Coral Springs, FL (US); David J Ley, Plantation, FL (US); Tommy Thomadsen, Glostrup (DK)

(73) Assignee: MOTOROLA SOLUTIONS, INC., Schaumburg (IL)

( * ) Notice: Subject to any disclaimer, the term of this patent is extended or adjusted under 35 U.S.C. 154(b) by 210 days.

(21) Appl. No.: 14/200,606

(22) Filed: Mar. 7, 2014

(65) Prior Publication Data
US 2015/0256535 A1    Sep. 10, 2015

(51) Int. Cl.
*H04L 29/06*    (2006.01)
*G06F 9/48*    (2006.01)

(52) U.S. Cl.
CPC ............ *H04L 63/0853* (2013.01); *G06F 9/485* (2013.01)

(58) Field of Classification Search
CPC ............................. H04L 63/0853; G06F 9/485
See application file for complete search history.

(56) References Cited

U.S. PATENT DOCUMENTS

| | | | |
|---|---|---|---|
| 5,862,377 A * | 1/1999 | Lee ........................... | G06F 9/54 719/313 |
| 6,324,588 B1 | 11/2001 | Desruisseaux | |
| 6,895,408 B1 * | 5/2005 | Kavantzas ............ | G06F 9/4436 |
| 7,188,163 B2 | 3/2007 | Srinivasan | |
| 7,464,383 B1 | 12/2008 | Dow | |
| 7,505,753 B2 | 3/2009 | Sprvari | |
| 8,583,292 B2 | 11/2013 | Preston | |
| 8,595,489 B1 | 11/2013 | Faaborg | |
| 8,839,360 B1 * | 9/2014 | Orr ........................ | G06F 21/33 726/2 |
| 2005/0273773 A1 | 12/2005 | Gold et al. | |
| 2007/0174318 A1 | 7/2007 | Leff et al. | |
| 2008/0064383 A1 | 3/2008 | Nath et al. | |
| 2009/0007066 A1 | 1/2009 | Grechanik | |
| 2010/0094806 A1 * | 4/2010 | Apostolides ........ | G06F 12/0815 707/637 |
| 2011/0225643 A1 * | 9/2011 | Faynberg ............... | G06F 21/31 726/10 |
| 2013/0218574 A1 | 8/2013 | Falcon | |

FOREIGN PATENT DOCUMENTS

WO          201146519 A1      11/2011

OTHER PUBLICATIONS

Albrecht et al., "Distributed Application Configuration, Management, and Visualization with Plush", Dec. 2011, ACM Transactions on Internet Technology, vol. 11, No. 2, Article 6, pp. 1-41.*
PCT International Search Report Dated Jun. 5, 2015 for Counterpart Application PCT/US2015/017911.

* cited by examiner

*Primary Examiner* — Matthew Smithers

(57) ABSTRACT

Disclosed herein are methods and systems for token-based application management. In an embodiment, requests are received from applications for tokens that can be active or inactive. A token-interaction-directive pool is maintained in data storage, each directive having a triggering token, a target token, and one or both of triggering-token actions and target-token actions. Responsive to receiving a token request from an application, any directives having their triggering token equal the requested token and having their target token active are identified. A response plan that includes the actions in the identified directives is generated. Any triggering-token actions in the response plan are communicated to the requesting application, and any target-token actions in the response plan are communicated to each application that is authorized to access the corresponding target token.

20 Claims, 15 Drawing Sheets

| 600 | | TRIGGERING TOKEN *620* | | |
|---|---|---|---|---|
| | | GPS TOKEN *302* | VIDEO TOKEN *304* | EMERGENCY TOKEN *306* |
| TARGET TOKEN *622* | GPS TOKEN *302* | ALLOW *602* | ALLOW *608* | SUSPEND *614* |
| | VIDEO TOKEN *304* | ALLOW *604* | PEND *610* | REVOKE *616* |
| | EMERGENCY TOKEN *306* | PEND *606* | BLOCK *612* | ALLOW *618* |

| TARGET TOKEN 622 | TRIGGERING TOKEN 620 | | |
|---|---|---|---|
| | GPS TOKEN 302 | VIDEO TOKEN 304 | EMERGENCY TOKEN 306 |
| GPS TOKEN 302 | ALLOW 602 | ALLOW 608 | SUSPEND 614 |
| VIDEO TOKEN 304 | ALLOW 604 | PEND 610 | REVOKE 616 |
| EMERGENCY TOKEN 306 | PEND 606 | BLOCK 612 | ALLOW 618 |

METHODS AND SYSTEMS FOR TOKEN-BASED APPLICATION MANAGEMENT

BACKGROUND

It is common for people to use computing and communication devices that are often, though not always, portable in nature. These devices are often arranged to be able to run (i.e., execute) multiple different applications, some of which come pre-loaded (i.e., installed) on the devices, and others of which are installed at a later time though still provided by a manufacturer of the device and/or a wireless service provider that may be uniquely associated with the device; such applications are often referred to as native applications. And still other applications that are installed at a time subsequent to the provisioning and/or sale of the device are written by other developers, companies, and the like, and are often referred to as third-party applications, and typically are written to comply with what is known as an application programming interface (API) that is provided in connection with the associated operating system of the device.

One challenge with which device designers and/or manufacturers are often faced is the management of interactions among applications installed on their respective devices, whether those applications are native applications or third-party applications. Such interactions often are in the context of multiple applications seeking to consume processing power and time, memory and other data-storage resources, and user-interface components such as displays, microphones, speakers, and the like. In the case of devices implementing only native applications, such interactions are typically handled using specific controls that are programmed into an operating system of the device and/or into one or more of the native applications themselves. Such controls are therefore not dynamically configurable. The challenge of managing such interactions once third-party applications are present is even more complex. Accordingly, there is a need for methods and systems for token-based application management.

SUMMARY OF THE INVENTION

Disclosed herein are methods and systems for token-based application management. One embodiment takes the form of a method carried out by a processor-based computing system executing stored instructions. The method includes receiving, from respective applications among a plurality of applications, token requests that each identify a respective requested token from a pool of tokens that are each togglable between (i) an active state in which one or more of the applications are authorized to access the token and (ii) an inactive state in which none of the applications are authorized to access the token. The method further includes maintaining in data storage a token-interaction-directive pool comprising a plurality of token-interaction directives, each token-interaction directive specifying (i) a triggering token for that token-interaction directive, (ii) a target token for that token-interaction directive, and (iii) one or both of (a) one or more actions that are to be taken with respect to the triggering token for that token-interaction directive and (b) one or more actions that are to be taken with respect to the target token for that token-interaction directive. The method also includes, responsive to receiving a given token request from a given application, identifying the one or more token-interaction directives for which (i) the triggering token is the requested token that is identified by the given token request and (ii) the target token is active. The method also includes generating a response plan comprising the actions included in the identified one or more token-interaction directives. The method also includes communicating each action in the response plan that is to be taken with respect to the triggering token for the corresponding token-interaction directive to the given application. The method also includes communicating each action in the response plan that is to be taken with respect to the target token for the corresponding token-interaction directive to each application that is authorized to access that target token.

Another embodiment takes the form of a system that includes a communication interface, a processor, and data storage containing instructions executable by the processor for causing the system to carry out at least the functions described in the preceding paragraph. Moreover, any one or more of the additional functions, features, characteristics, options, and the like that are described below and elsewhere in this disclosure apply equally to both method and system embodiments, and are specifically not limited in applicability to the embodiment in connection with which they are described. Thus, when the clause "In at least one embodiment" (and other similar language) is used in the balance of this written description, it is affirmatively stated here that this should be taken to mean "In at least one method embodiment and/or in at least one system embodiment and/or in at least one embodiment of any other type."

In at least one embodiment, at least one token in the pool of tokens represents an application. In at least one embodiment, at least one token in the pool of tokens represents an application state. In at least one embodiment, at least one token in the pool of tokens represents a group of applications. In at least one embodiment, at least one token in the pool of tokens represents a user-interface device. In at least one embodiment, one or more of the token-interaction directives in the token-interaction-directive pool are configurable via a user interface.

In at least one embodiment, the response plan includes an allow action that is to be taken with respect to the triggering token for the corresponding token-interaction directive, said allow action allowing the given application to access the requested token. At least one such embodiment further involves changing the triggering token in the corresponding token-interaction directive from the inactive state to the active state.

In at least one embodiment, the response plan includes a block action that is to be taken with respect to the triggering token for the corresponding token-interaction directive, said block action blocking the given application from accessing the requested token.

In at least one embodiment, the response plan includes a pend action that is to be taken with respect to the triggering token for the corresponding token-interaction directive, said pend action placing the given application in a pending state of waiting for authorization to access the requested token. At least one such embodiment further involves communicating to the given application notice of authorization to access the requested token, and at least one of those embodiments further involves changing the triggering token in the corresponding token-interaction directive from the inactive state to the active state.

In at least one embodiment, the response plan includes a revocation action that is to be taken with respect to the target token for the corresponding token-interaction directive, said revocation action transitioning one or more applications that at that time were authorized to access the target token into a state of not being authorized to access the target token.

In at least one embodiment, the response plan includes a suspend action that is to be taken with respect to the target token for the corresponding token-interaction directive, said suspend action placing one or more applications that at that time were authorized to access the target token in a suspended state of (i) not being authorized to access the target token and (ii) waiting for reauthorization to access the target token. At least one such embodiment further involves changing the target token in each of the one or more corresponding token-interaction directives from the active state to the inactive state. At least one other such embodiment further involves communicating to each of the one or more applications notice of reauthorization to access the target token, and at least one of those embodiments further involves changing the target token in each of the one or more corresponding token-interaction directives from the inactive state to the active state.

In at least one embodiment, the response plan includes at least one action selected based at least in part on a priority level associated with one or more token requests.

In at least one embodiment: (i) one or more of the applications are token-unaware applications, (ii) receiving token requests from at least one token-unaware application involves receiving token requests from the at least one token-unaware application via a proxy, (iii) communicating actions to the at least one token-unaware application involves communicating actions to the at least one token-unaware application via the proxy, and (iv) the proxy translates between (a) a token-aware API and (b) an API supported by the at least one token-unaware application.

The above overview is intended to be illustrative and not limiting. Moreover, the presently disclosed methods and systems will be more readily understood in light of the drawings and their accompanying descriptions, which again are provided by way of illustration and example explanation, not by way of limitation.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
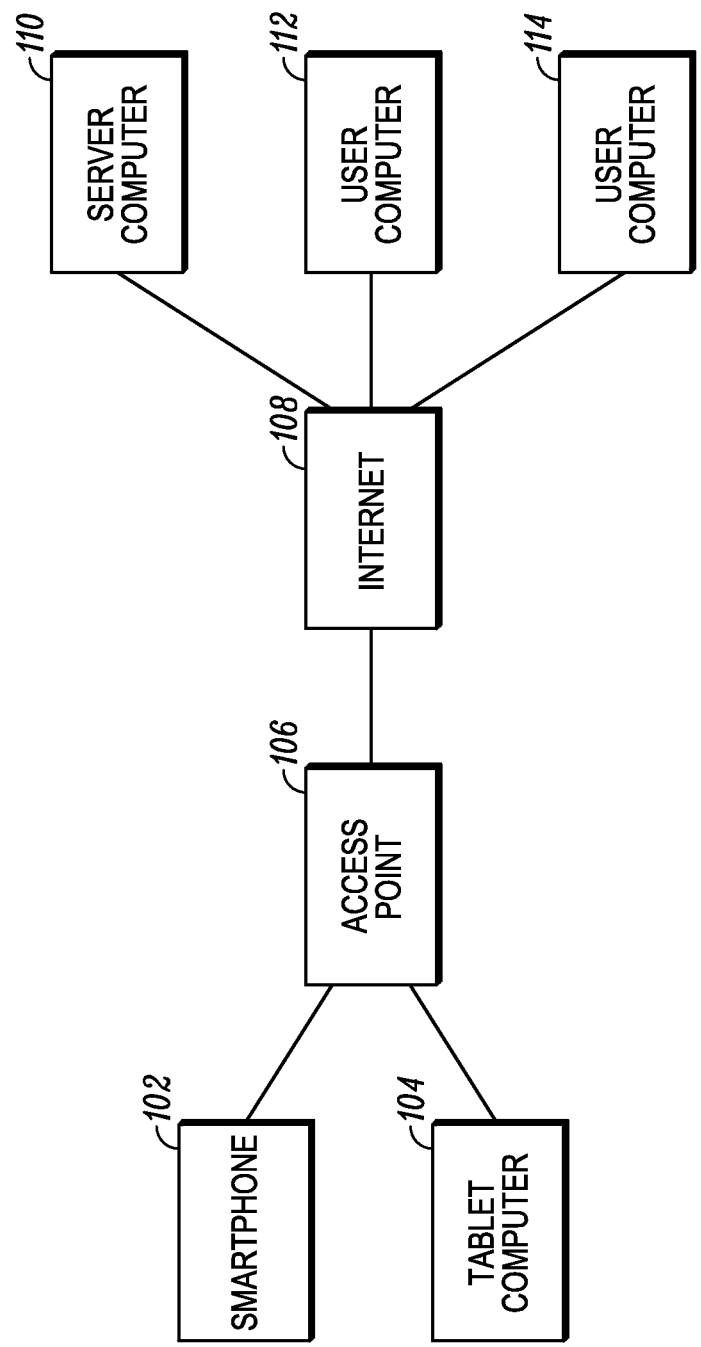
FIG. 1 is a block diagram of an example system in which various embodiments may be used.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

I. Example Architecture

A. Example Communication System and Computing Device

FIG. 1 is a block diagram of a system in which various described embodiments may be used. As shown in FIG. 1, system 100 includes a smartphone 102 and a tablet computer 104 communicatively connected to an access point 106, which is in turn communicatively connected to the Internet (or other suitable data-communication network or networks) 108. Also communicatively connected to the Internet as are a server computer 110, a user computer 112, and a user computer 114. The devices 102-106 and 110-114 that are depicted in FIG. 1 are by way of example only, as fewer, more, and/or different types and numbers of computing and communication devices could be present in various different scenarios. Furthermore, each such device may include such conventional components as a communication interface, processor(s), and/or user interface and the like, as well as non-transitory data storage containing instructions executable by the respective processor for carrying out functions particular to a given device.

B. Example Computing and Communication Device

Figure 2:
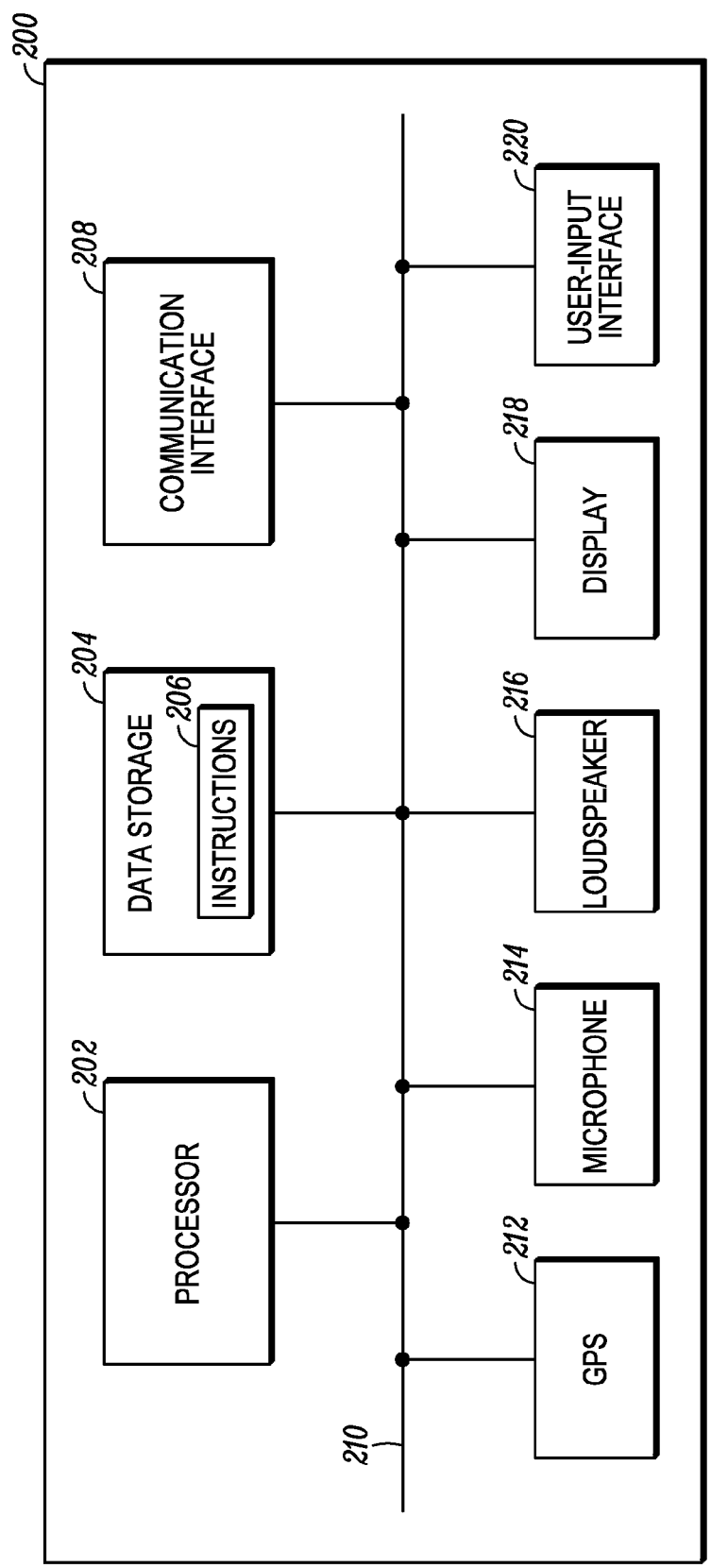
FIG. 2 is a block diagram of an example computing device, in accordance with various embodiments.

FIG. 2 is a block diagram of an example computing and communication device (referred to hereinafter for brevity simply as a "computing device"), in accordance with various embodiments. In the embodiment depicted in FIG. 2, computing device 200 includes a processor 202, a data storage 204 storing instructions 206, and a communication interface 208, each of which are interconnected via system bus (or other communication mechanism) 210. And computing device 200 is also depicted as including several other example components connected to the system bus 210. These other components include a Global Positioning System (GPS) module (e.g., chipset) 212, user-interface devices such as a microphone 214, a loudspeaker 216, a display 218, and a more generally phrased user-input interface 220, which itself may include components such as keyboards, mice, touchscreens, the microphone 214, and/or the like.

In various different embodiments, when described as the entity carrying out functions in accordance with the present methods and systems, computing device 200 may take the form of smartphone 102, tablet computer 104, access point 106, server computer 110, user computer 112, user computer 114, and/or any other computing device capable of performing the computing-device functions described herein. In any given implementation, one or more of these devices may have a structure and arrangement similar to that described in connection with FIG. 2.

Processor 202 may take the form of (or include) one or more general-purpose processors and/or one or more special-purpose processors, and may be integrated in whole or in part with data storage 204, communication interface 208, and/or any other components of computing device 200. Processor 202 could take other forms as well, as deemed suitable by those of skill in the art for a particular implementation or in a particular context.

Data storage 204 may be any component capable of performing the respective data-storage functions described herein. Data storage 204 may store program instructions 206, a token-interaction-directive pool (further described below), and/or user-interface data, among numerous other possibilities. The data storage may take the form of (or include) a non-transitory computer-readable medium such as a hard drive, a solid-state drive, an EPROM, a USB storage device, a CD-ROM disk, a DVD disk, any other non-volatile storage, or any combination of these, to name just a few examples. Program instructions 206 may include machine-language instructions executable by processor 204 to carry out various functions described herein. The data storage and/or program instructions could take other forms as well, as deemed suitable by those of skill in the art for a particular implementation or in a particular context.

Communication interface 208 may be any component capable of performing the communication-interface functions described herein. Communication interface 208 could take the form of (or include) an Ethernet, Wi-Fi, Bluetooth, and/or universal serial bus (USB) interface, and/or a system bus, among other examples. Communication interface 208 could facilitate communication among components within computing device 200 and/or with other entities communicatively connected to computing device 200, among other possibilities. For example, computing device 200 might be communicatively connected to a server, a user device, or other entity, and as such could facilitate communication between computing device 200 and these entities. Those having skill in the art will recognize that communication interface 208 and/or system bus 210 could take other forms as well, as deemed suitable by those of skill in the art for a particular implementation or in a particular context.

II. Example Operation

Figure 4:
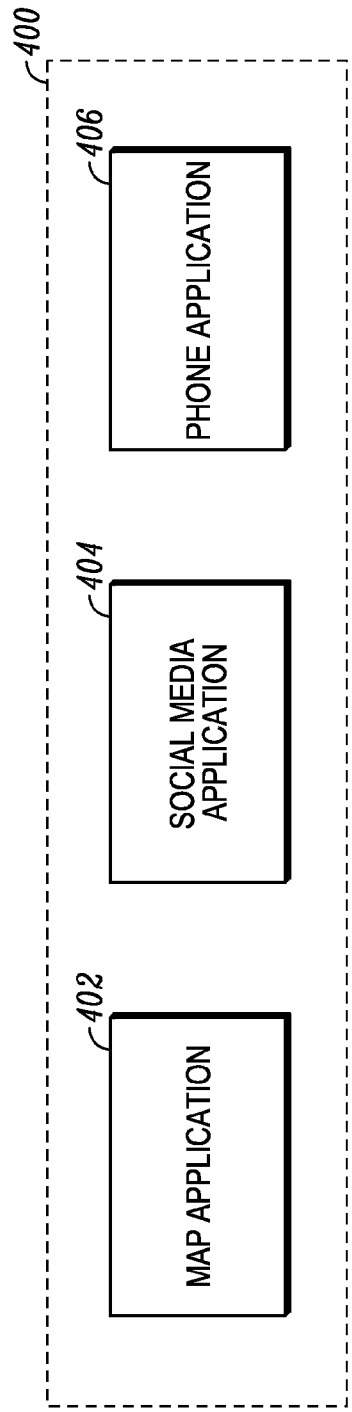
FIG. 4 is a block diagram of an example plurality of applications, in accordance with various embodiments.
Figure 15:
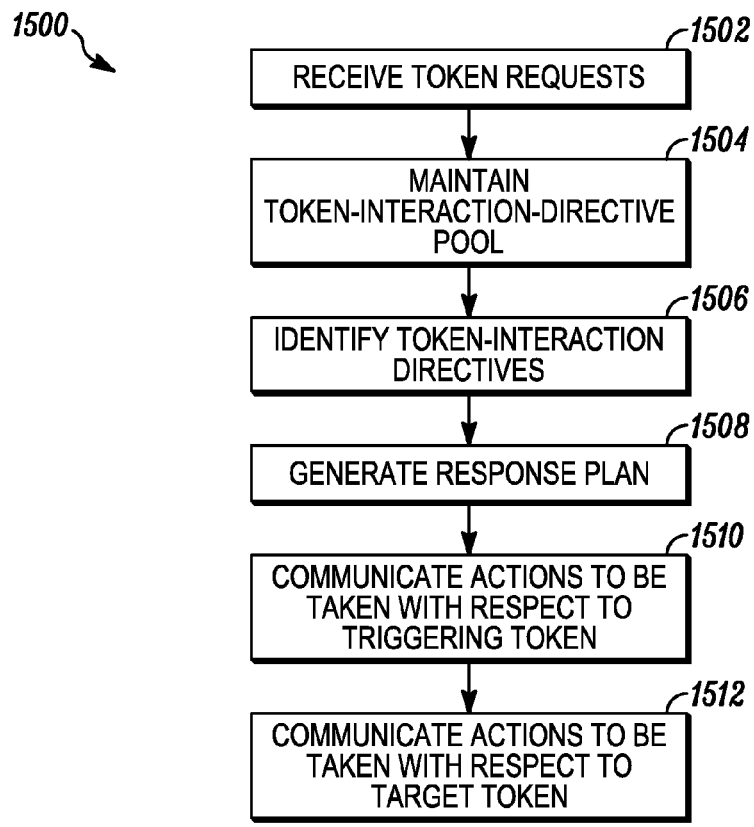
FIG. 15 depicts an example method, in accordance with various embodiments.

Turning the reader's attention for the moment to FIG. 15, depicted there is a flowchart of a method, in accordance with various embodiments. As shown in FIG. 15, method 1500 begins at step 1502 with computing device 200 receiving, from respective applications among a plurality of applications, token requests that each identify a respective requested token from a pool of tokens. In an embodiment depicted in FIG. 4, an example plurality of applications 400 includes a map application 402, a social media application 404, and a phone application 406. It should be understood that additional and/or different applications may be present in other example pluralities of applications.

Tokens, as used in this disclosure, are essentially stored data objects that are managed in a central manner by the present systems and methods, and that are flexible in their usability such that different tokens can be used to represent in a unified manner what in prior implementations have been considered and treated as heterogeneous entities, system resources, and the like. That is, tokens can be used in accordance with the present methods and systems to represent (i) applications, (ii) application states (e.g., in the context of a single phone application, one token could represent a "ringing" state while another could represent a "talking" state, and so on), (iii) groups of applications (e.g., a certain token could represent a group of "utility applications" such as {calculator, notepad, and reminders}), (iv) a user-interface device (i.e., device or capability) (such as use of a microphone, speaker, display, and/or the like), and/or one or more other such entities, system resources, and/or the like.

Thus, in an embodiment, at least one token in the pool of tokens represents an application. For example, a calculator token could represent a calculator application. In at least one embodiment, a token representing an application is in the active state if the application is executing, and is in the inactive state if the application is not executing (as just one possibility). Those having skill in the art will appreciate that a token representing an application may take other forms as well.

In an embodiment, at least one token in the pool of tokens represents an application state. For example, a video record token could represent a given video application in a record state, and a video playback token could represent the video application in a playback state. In at least one embodiment, a token representing a state of a respective application is in the active state if the application is (both executing and) in the given state, and is in the inactive state if the application is not in the given state (perhaps whether the application is executing or not).

In an embodiment, at least one token in the pool of tokens represents a group of applications. For example, a voice communication token could represent a group of applications that (individually or collectively) provide voice communication services. Accordingly, in at least one embodiment, a token representing a group of applications is in the active state if any application in the group is executing, and instead the token is inactive if none of the applications in the group are executing (as an example). Those having skill in the art will appreciate that a token representing a group of applications may take other forms as well.

In an embodiment, at least one token in the pool of tokens represents a device state, which may include, as examples, an airplane mode, a covert mode, an emergency mode, a computing-device-locked mode, a computing-device-lost/stolen mode, an at-work mode, an at-home mode, a privileged user mode, an administrator mode, a low-battery mode, an out-of-communication-range mode, an in-vehicle mode, and/or a novice-user mode, among numerous other possible examples.

In an embodiment, at least one token in the pool of tokens represents a user-interface device. For example, a microphone token could represent a microphone (or the use thereof) of computing device 200. In at least one embodiment, a token that represents a given user-interface device is in the active state if the given user-interface device is in use, and is in the inactive state if the user-interface device is not in use, as just one possibility.

Figure 3:
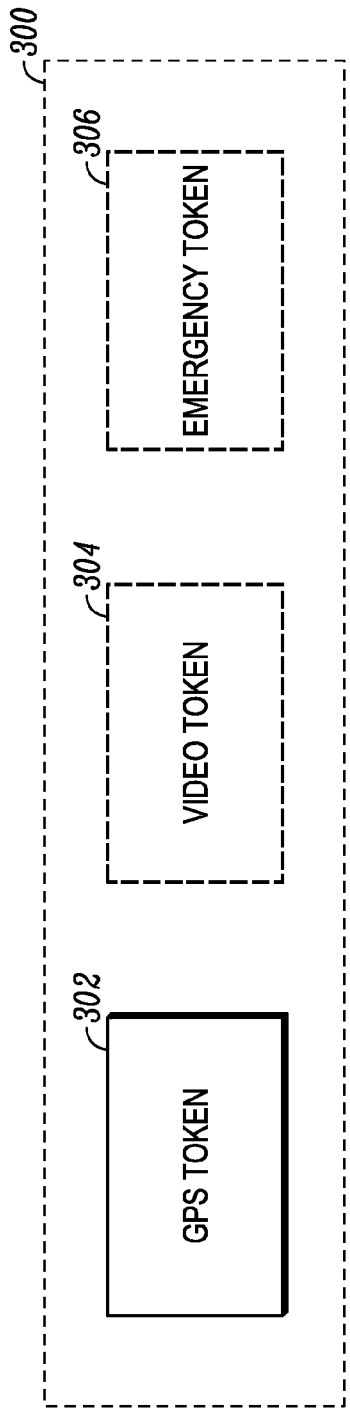
FIG. 3 is a block diagram of an example pool of tokens, in accordance with various embodiments.

FIG. 3 is a block diagram of a pool of tokens, in accordance with various embodiments. In the embodiment depicted in FIG. 3, a token pool 300 contains a GPS token 302, a video token 304, and an emergency token 306. It should be understood that the tokens depicted in FIG. 3 are provided as examples, and that token pool 300 may contain different and/or additional tokens.

In an embodiment, GPS token 302 represents use of GPS hardware 212 of computing device 200. In another embodiment, GPS token 302 represents computing device 200 having acquired at least one GPS satellite signal and/or the computing device having obtained a position fix via GPS. Those having skill in the art will recognize that GPS token 302 may take other forms as well.

In an embodiment, video token 304 represents computing device 200 (i) displaying a video via a computing-device display and (ii) outputting sound associated with the video via a computing-device loudspeaker. In another embodiment, video token 304 represents computing device 200 playing a video and outputting the associated sound, but not necessarily displaying the video via the computing-device display—for example, if the video is playing in the background while a different application is in the foreground. In a further embodiment, video token 304 represents computing device 200 playing a video and displaying the video via the computing-device display, but not necessarily outputting the associated sound—for example, if computing-device 200 is set to a mute-volume state. Those having skill in the art will recognize that video token 304 may take other forms as well.

In an embodiment, emergency token 306 represents the computing device 200 being in an emergency state. For example, an application may request emergency token 306 upon receiving an emergency-state indication via a user interface (corresponding, for example, to an "emergency" button having been pressed), an indication that a person is injured, upon detecting high amounts of $CO_2$ or CO, and/or upon detecting excess acceleration and/or sudden impacts of computing device 200, among numerous other possible examples.

In an embodiment, each of the tokens in token pool 300 are togglable between (i) an active state in which one or more of the applications are authorized to access the token and (ii) an inactive state in which none of the applications are authorized to access the token. In FIG. 3 and in subsequent figures, tokens in the active state are shown with a solid border (e.g., token 302), and tokens in the inactive state are shown with a dashed border (e.g., tokens 304 and 306).

The token requests (that are received at step 1502) are received from applications that are at that time being executed by computing device 200. In an embodiment, the token requests are received from applications being executed at that time by a different device. The requests may be received via interprocess communication (IPC) (using, e.g., named pipes, shared memory, and/or sockets), common object request broker architecture (COBRA), hypertext transfer protocol (HTTP), representational state transfer (REST), simple object access protocol (SOAP), web services description language (WSDL), any combination of these, and/or any other manner of receiving requests from applications.

Figure 6:
FIG. 6 depicts an example token-interaction-directive pool, in accordance with various embodiments.

At step 1504, and with reference to FIG. 6, the computing device 200 maintains in data storage a token-interaction-directive pool 600 comprising a plurality of token-interaction directives 602 through 618. In various different embodiments, the data storage—in which computing device 200 maintains the token-interaction-directive pool 600—may take the form of (or include) data storage 204 of computing device 200, data storage of a separate entity such as server computer 110 (perhaps functioning as a relational database management server (RDBMS) and/or an application server (AS)), and/or any other data storage. And certainly other data-storage strategies and/or arrangements could be implemented as well.

As shown in FIG. 6, the token-interaction-directive pool 600 includes a plurality of token-interaction directives 602 through 618. Each token-interaction directive specifies a triggering token 620 for that token-interaction directive and a target token 622 for that token-interaction directive. In FIG. 6, the respective triggering token 620 for a given token-interaction directive is shown above that token-interaction directive, and the respective target token 622 for the given token-interaction directive is shown to the left of the that token-interaction directive. Thus, as an example, the "block" directive 612 has the video token 304 as its triggering token and the emergency token 306 as its target token.

Figure 16:
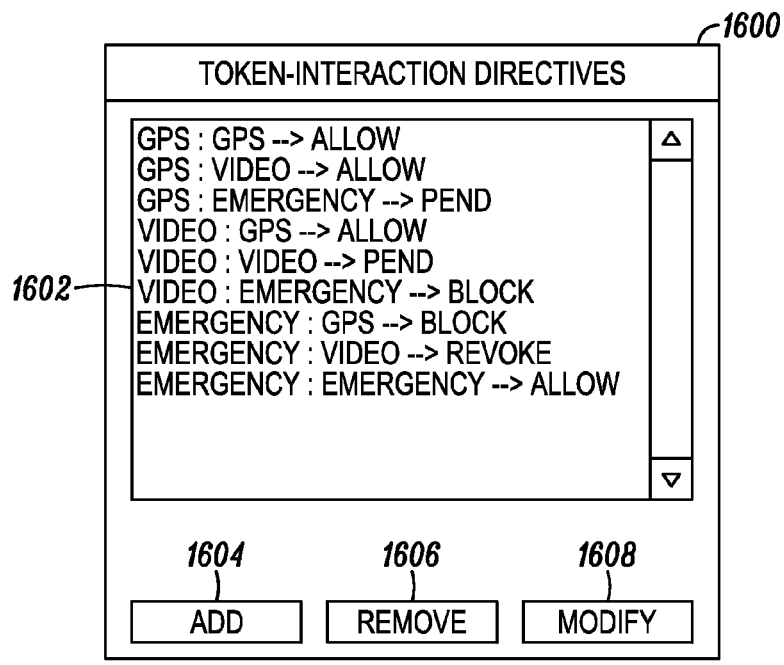
FIG. 16 depicts a user interface via which token-interaction directives in a token-interaction-directive pool may be configured, in accordance with various embodiments.

Each token-interaction directive further specifies one or both of (a) one or more actions that are to be taken with respect to the triggering token for that token-interaction directive and (b) one or more actions that are to be taken with respect to the target token for that token-interaction directive. In an embodiment, one or more of the token-interaction directives in the token-interaction-directive pool 600 are configurable. The directives might be user-configurable via a user interface—e.g., via the example user interface 1600 that is depicted in FIG. 16. As shown in FIG. 16, interface 1600 includes a list of token-interaction directives 1602, an add button 1604, a remove button 1606, and a modify button 1608. The interface could be presented by computing device 200, and/or an entity separate from computing device 200, as examples. Additionally or alternatively, the directives may be configured by an entity such as server computer 110 (or any other computing device) and/or an application or operating system (with or without a user interface) executable by a computing device (e.g., by computing device 200 and/or server computer 110), among numerous other examples. Those having skill in the art will appreciate that the token-interaction directives may be configurable in other ways as well. Interface 1600 may include different and/or additional elements and could be presented in a manner different than those described above. Configurability via a user interface such as the interface 1600 may enable users to add, delete, and modify directives with respect to their actions, triggering tokens, and/or target tokens, among other possibilities.

Figure 7:
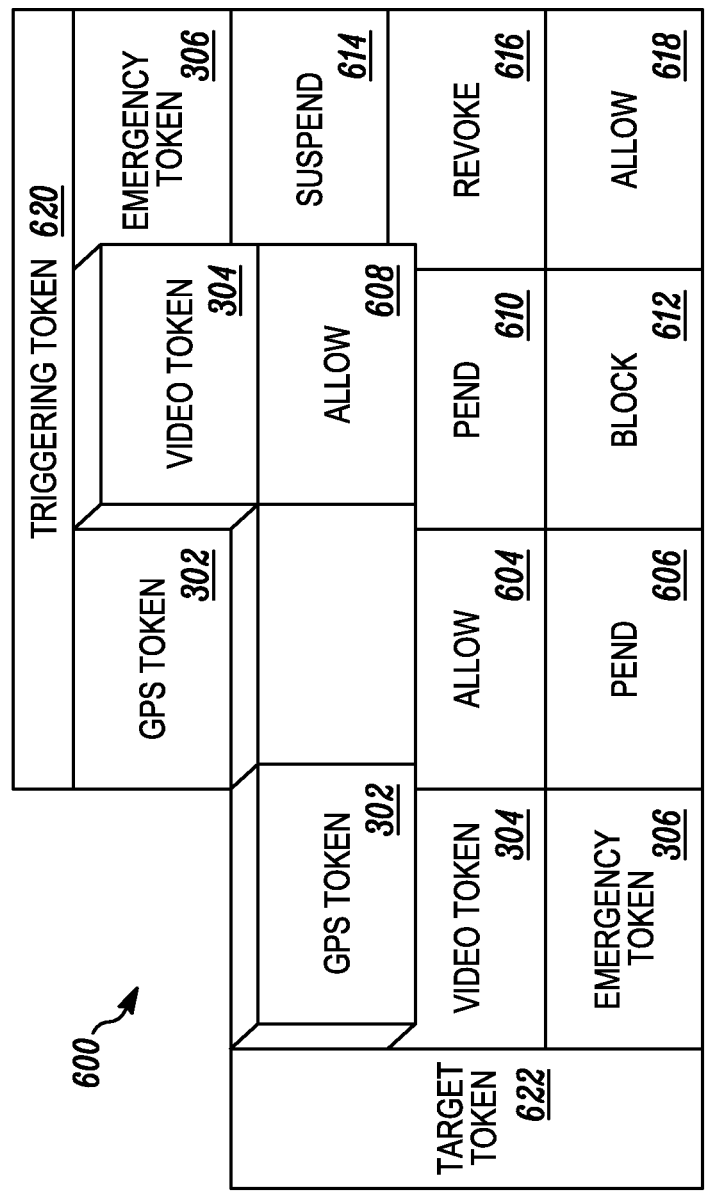
FIG. 7 depicts several example token-interaction directives, in accordance with various embodiments.

FIG. 7 depicts an example token-interaction directive, in accordance with various embodiments. As shown, token-interaction directive 608 specifies video token 304 as the triggering token 620 and specifies GPS token 302 as the target token 622. Token-interaction directive 608 also specifies an action that is to be taken with respect to video token 304—namely, an allow action (which is further described below).

Turning the reader's attention back to FIG. 15, at step 1506, responsive to receiving a given token request from a given application, computing device 200 identifies the one or more token-interaction directives for which (i) the triggering token is the requested token that is identified by the given token request (that was received at step 1502) and (ii) the target token is active (i.e., in the active state). At step 1508, computing device 200 generates a response plan that contains the actions included in the one or more token-interaction directives that were identified at step 1506.

In various different embodiments, the response plan includes allow actions, block actions, and/or pend actions to be taken with respect to the triggering token for the corresponding token-interaction directive. The allow action allows the given application to access the requested token. The block action blocks the given application from accessing the requested token. The pend action places the given application in a pending state of waiting for authorization to access the requested token. Those having skill in the art will appreciate that the response plan may include additional and/or different actions to be taken with respect to the triggering token for the corresponding token-interaction directive.

In an embodiment, the response plan includes an allow action and computing device 200 changes the triggering token in the corresponding token-interaction directive from the inactive state to the active state (if, e.g., the triggering token is not already active). In an embodiment, the response plan includes a pend action and computing device 200—after having previously placing the given application in a pending state of waiting for authorization to access the requested token—communicates, to the given application, notice of authorization to access the requested token. For example, the computing device may communicate the notice of authorization in response to the target token in the corresponding token-interaction directive changing from the active state to the inactive state and/or in response to computing device 200 receiving, from an application authorized to access the target token, an indication that the application is relinquishing access to the target token. In an embodiment, computing device 200, in addition to communicating the notice of authorization, changes the triggering token in the corresponding token-interaction directive from the inactive state to the active state. Those having skill in the art will recognize that other variations are possible as well.

In various different embodiments, the response plan includes revocation actions and/or suspend actions to be taken with respect to the target token for the corresponding token-interaction directive. The revocation action transitions one or more applications that at that time were authorized to access the target token into a state of not being authorized to access the target token. The suspend action places one or more applications that at that time were authorized to access the target token in a suspended state of (i) not being authorized to access the target token and (ii) waiting for reauthorization to access the target token.

In some embodiments, after or as part of carrying out a suspend action, the computing device 200 changes the target token in each of the one or more corresponding token-interaction directives from the active state to the inactive state. In some embodiments—after having previously placed one or more applications in the suspended state, computing device 200 later communicates, to each of those one or more applications, notice of reauthorization to access the target token. In at least some such embodiments, in addition to communicating notice of reauthorization to each of the one or more applications, the computing device 200 changes the target token in each of the one or more corresponding token-interaction directives from the inactive state to the active state.

The response plan may include at least one action selected based at least in part on a priority level associated with one or more token requests. In at least one embodiment, the response plan includes an exclusive action that is implemented as follows: if a first priority level associated with a first-in-time token request received from a first application is higher than a second priority level associated with a second-in-time token request received a second application, then the first application's access to the requested token is left undisturbed, and the second application is blocked from accessing the requested token; if, however, the second priority level is higher than the first priority level, the first application's access to the requested token is revoked, and the second application is granted (i.e., allowed) access to the requested token. And certainly other implementations of similar directives are possible.

In at least one embodiment, the response plan includes a one-at-a-time action that is implemented as follows: if a first priority level associated with a first-in-time token request received from a first application is higher than a second priority level associated with a second-in-time token request received a second application, then the first application's access to the requested token is left undisturbed, and the second application is placed in the pending (i.e., waiting) state with respect to the requested token, if, however, the second priority level is higher than the first priority level, the first application's access to the requested token is suspended (i.e., it is the first application that is placed in a waiting state), and the second application is granted (i.e., allowed) access to the requested token. And certainly other implementations of similar directives are possible.

Turning the reader's attention again to FIG. 15, the reader will recall that the response plan (that was generated at step 1508) includes actions that are each respectively associated with a given token-interaction directive (that was identified at step 1506). Thus, the response plan includes one or both of (a) one or more actions that are to be taken with respect to the triggering token for the corresponding token-interaction directive and (b) one or more actions that are to be taken with respect to the target token for the corresponding token-interaction directive.

At step 1510, then, computing device 200 communicates each action (if there are any) in the response plan that is to be taken with respect to the triggering token for the corresponding token-interaction directive to the given application (from which the given token request was received). Examples of such actions—i.e., those that are to be taken with respect to triggering tokens—include allow, block, and pend, as those of skill in the art will appreciate that these are responses back to the application that requested the triggering token of a corresponding token-interaction directive.

And at step 1512, computing device 200 communicates each action (if there are any) in the response plan that is to be taken with respect to the target token for the corresponding token-interaction directive to each application that is authorized to access that target token. Examples of such actions—i.e., those that are to be taken with respect to target tokens—include revoke (i.e., revocation) and suspend, as those of skill in the art will appreciate that these are not responses back to the application that requested the triggering token of a corresponding token-interaction directive, but rather are actions taken with respect to tokens that were already active.

In connection with step 1510 and/or step 1512, actions may be communicated by computing device 200 in a manner similar to that in which token requests are received by computing device 200 (e.g., using IPC, COBRA, HTTP, REST, SOAP, WSDL, etc.).

In at least one embodiment, one or more of the applications—in the plurality of applications—are what are referred to in this disclosure as "token-unaware" applications. These token-unaware applications would be in contrast, then, with "token-aware" applications, which would be those that were explicitly designed and programmed to send token requests and to comply with actions communicated thereto; thus, for example, a token-aware application that wanted to use a microphone would request the microphone token from a token-manager module arranged to carry out the present systems and methods, and then proceed to use the microphone upon receiving an "allow" action, and would instead proceed to comply with receipt of a "block" or "pend" action, as examples. Such a token-manager module could be implemented in the computing device 200 as any combination of dedicated hardware, programmed hardware, programmed firmware, and/or any similar option deemed suitable by one of skill in the art for a given implementation or in a given context.

Token-unaware applications (e.g., third-party applications) by contrast would be programmed to interact with, e.g., an operating system of the computing device 200 according to an API provided for developers in connection with that operating system. Thus, a token-unaware application might address or otherwise direct a request to use the microphone to the operating system of the computing device 200, and similarly expect in return a response to that request from the operating system. In order to accommodate one or more token-unaware applications—executable alongside one or more token-aware applications, the present systems and methods implement a proxy (i.e., a hardware, firmware, and/or software-based proxy module) that translates between (i) a token-aware API (which would be used by token-aware applications for communicating with a token-interaction manager in accordance with the present systems and methods) and (ii) an API supported by a corresponding token-unaware application. Thus, a computing device 200 implementing the present systems and methods may have an operating system that directs requests from and responses to token-unaware applications via such a proxy.

Figure 17:
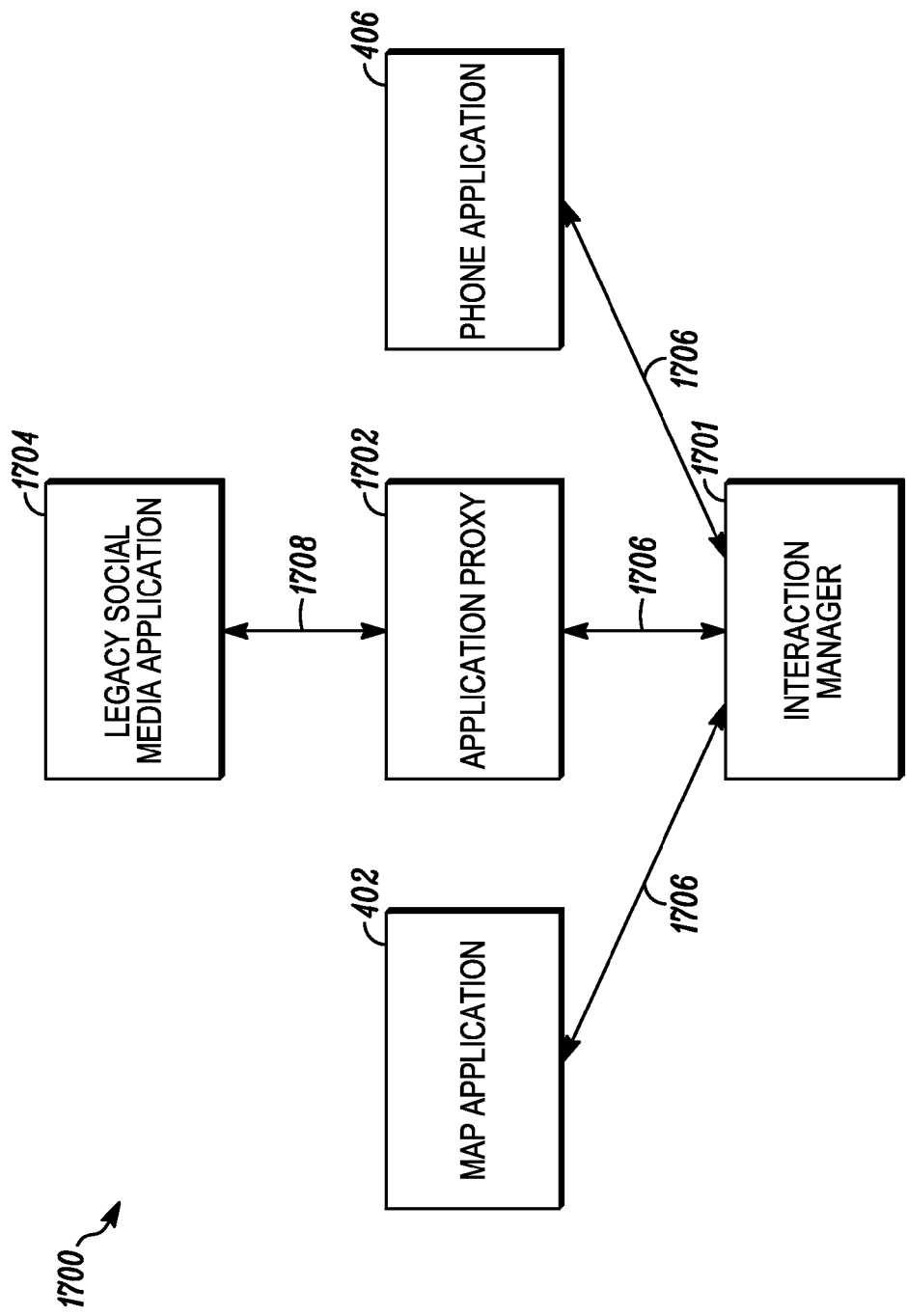
FIG. 17 is a block diagram depicting an example interaction between an example token interaction manager and several applications, both directly and via a proxy, in accordance with various embodiments.

Consider an illustrative example: FIG. 17 shows the map application 402, the phone application 406, and a token-unaware (e.g., legacy) social media application 1704, as well as an interaction manager (i.e., interaction manager module) 1701 and an application proxy (i.e., application proxy module) 1702. As is shown by way of example in FIG. 17, the interaction manager 1701 (i) receives token requests from the (token-unaware) legacy social media application 1704 via the application proxy 1702 and (ii) communicates actions to the (token-unaware) legacy social media application 1704 via the application proxy 1702.

As stated, in at least one embodiment, the application proxy 1702 translates between (i) a token-aware API (shown generally at 1706) and (ii) a token-unaware API (shown generally at 1708) that is supported by the token-unaware application 1704. In an embodiment, the application proxy 1702 may maintain a (perhaps updateable) table that maps between commands and the like of the token-aware API 1706 and the token-unaware API 1708. And while not necessarily the case in all embodiments, it is the case in at least the embodiment that is depicted in FIG. 17 that the token-aware API 1706 is also used (i) between the interaction manager 1701 and the (token-aware) map application 402 and (ii) between the interaction manager 1701 and the (token-aware) phone application 406.

Furthermore, in some embodiments, the application proxy 1702 is implemented separate from the interaction manager 1701 as depicted in FIG. 17, while in other embodiments the application proxy 1702 is implemented as a functional component of the interaction manager 1701. Moreover, different proxies 1702 can be designed and implemented for different token-unaware applications. In some embodiments, a relatively small number of proxies is implemented to account for a relatively small number of APIs approved for application development in connection with a given operating system. In some embodiments, the number of proxies may be relatively large, perhaps as high as a dedicated proxy being implemented on a per-token-unaware-application basis. And those of skill in the art will recognize that other ways of facilitating communication with token-unaware applications are possible as well.

Figure 8:
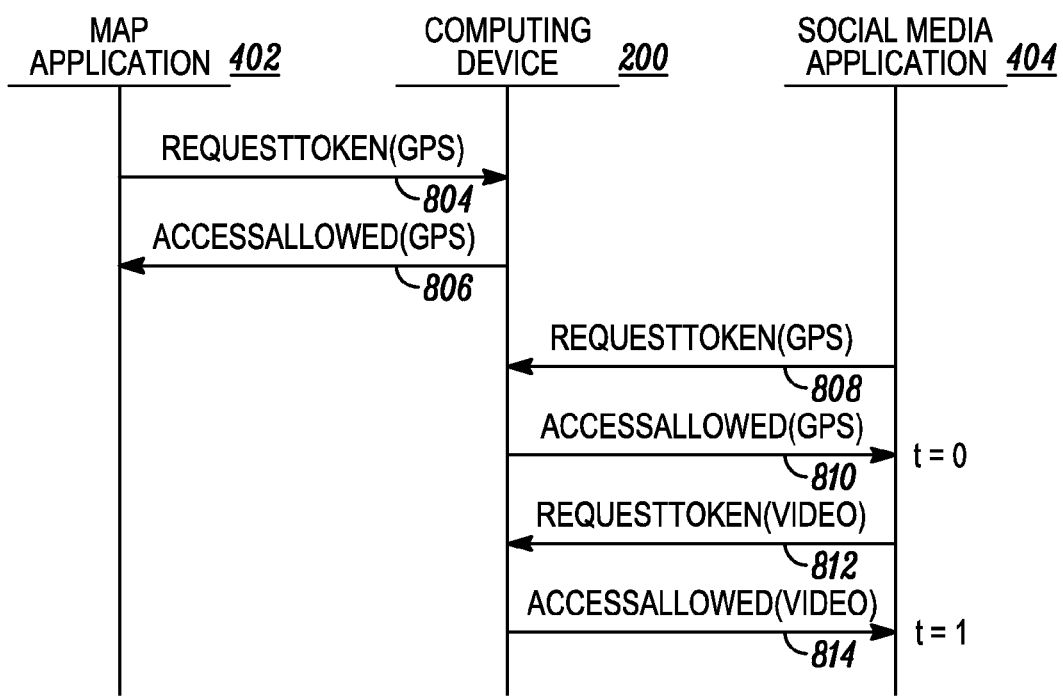
FIG. 8 depicts an example communication between a computing device and several respective applications, in accordance with various embodiments.

FIG. 8 depicts an example communication between computing device 200 and respective applications 402 and 404, in accordance with various embodiments. As shown, in the depicted example, prior to a first time instance (represented in FIG. 8 as "t=0"), computing device 200 receives a token request 804 from the map application 402, where the token request 804 identifies the GPS token 302 as the requested token. This token request might be received as a result of the map application 402 attempting to determine the current location of computing device 200, among many other possible examples. In the depicted example, no tokens are in the active state when computing device 200 receives token request 804 (and thus no token-interaction directives are implicated), and the computing device 200 responsively communicates an allow action 806 to map application 402.

Computing device 200 subsequently receives token request 808 from the social media application 404, where the token request 808 identifies the GPS token 302 as the requested token. The token request 808 might be received as a result of social media application 404 attempting to include a location of the computing device 200 (and thus likely a user thereof) in a given social-media communication. Computing device 200 identifies the token-interaction directives for which the triggering token is the requested token and the target token is active—in this case, only token-interaction directive 602. The computing device 200 generates a response plan that includes an allow action 810, as specified in token-interaction directive 602, and then communicates the allow action 810 to social media application 404. It may be the case that token-interaction directive 602 specifies an allow action for this interaction because no adverse interactions are anticipated from multiple applications accessing the GPS hardware.

Figure 5:
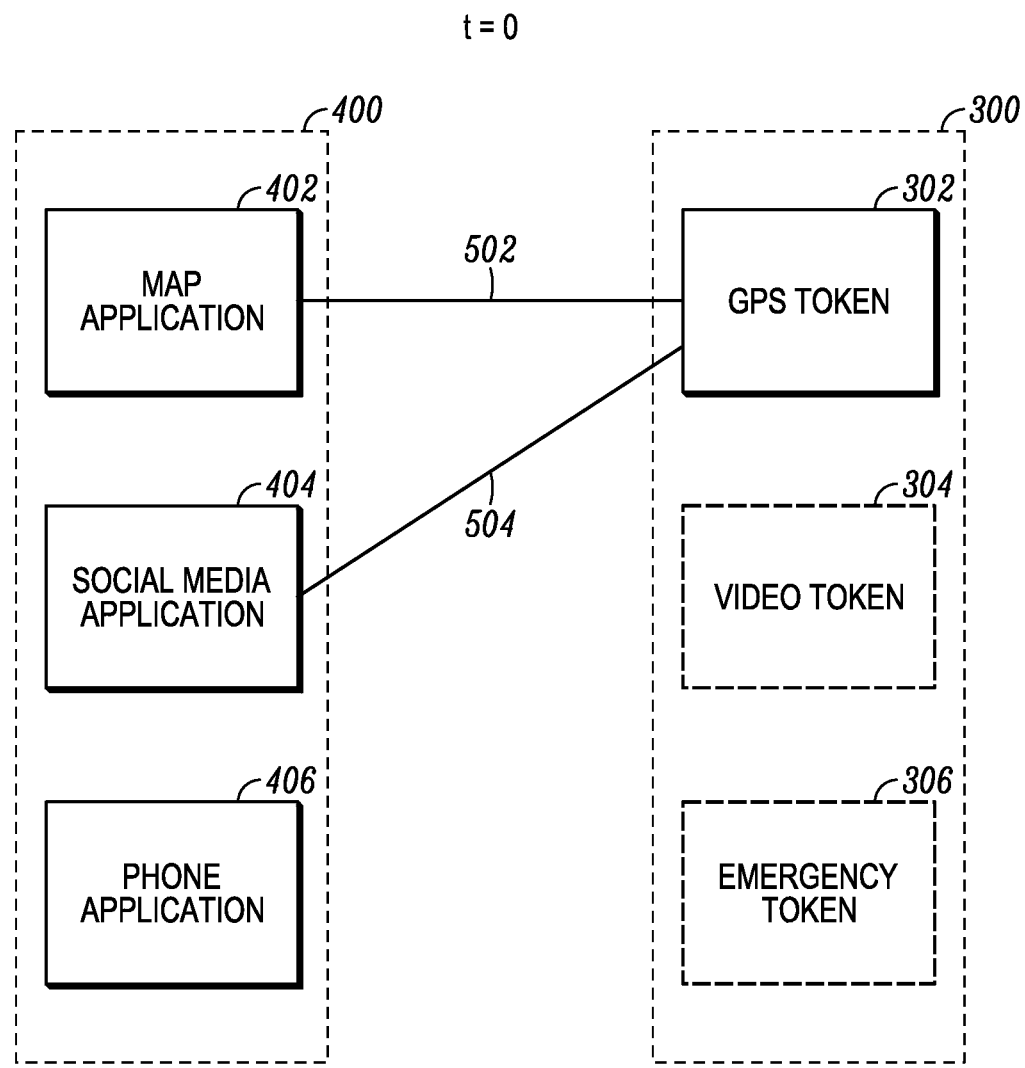
FIG. 5 is a block diagram identifying applications that are authorized to access given tokens at an example first time instance, in accordance with various embodiments.

FIG. 5 is a block diagram identifying the applications that are respectively authorized to access the various tokens in the token pool 300 at the first time instance (t=0), subsequent to computing device 200 communicating the allow actions 806 and 810. As indicated by the solid line 502, the map application 402 is authorized to access the GPS token 302. And as indicated by the solid line 504, the social media application 404 is also authorized to access the GPS token 302. In the depicted example, none of the applications are authorized to access either the video token 304 or the emergency token 306; as such, both of those tokens are marked inactive by dashed-line borders, while the active state of GPS token 302 is indicated by its solid-line border.

Computing device 200 subsequently receives from the social media application 404 a token request 812 that identifies the video token 304 as the requested token (perhaps as a result of the social media application 404 attempting to play a video via the user interface of the computing device 200). The computing device 200 responsively identifies the one or more token-interaction directives for which the triggering token is the requested video token 304 and for which the target token is active: in this case, only the token-interaction directive 608.

FIG. 7 depicts identified token-interaction directive 608—which, again, is the only token-interaction directive for which triggering token 620 is the video token 304 and for which the target token 622 (in this case, the GPS token 302) is active. As shown in FIG. 7, the token-interaction directive 608 specifies the allow action. Accordingly, the computing device 200 communicates to the social media application 404 an action 814, allowing the application 404 to access the video token 304, and also changes the video token 304 from inactive to active.

Figure 9:
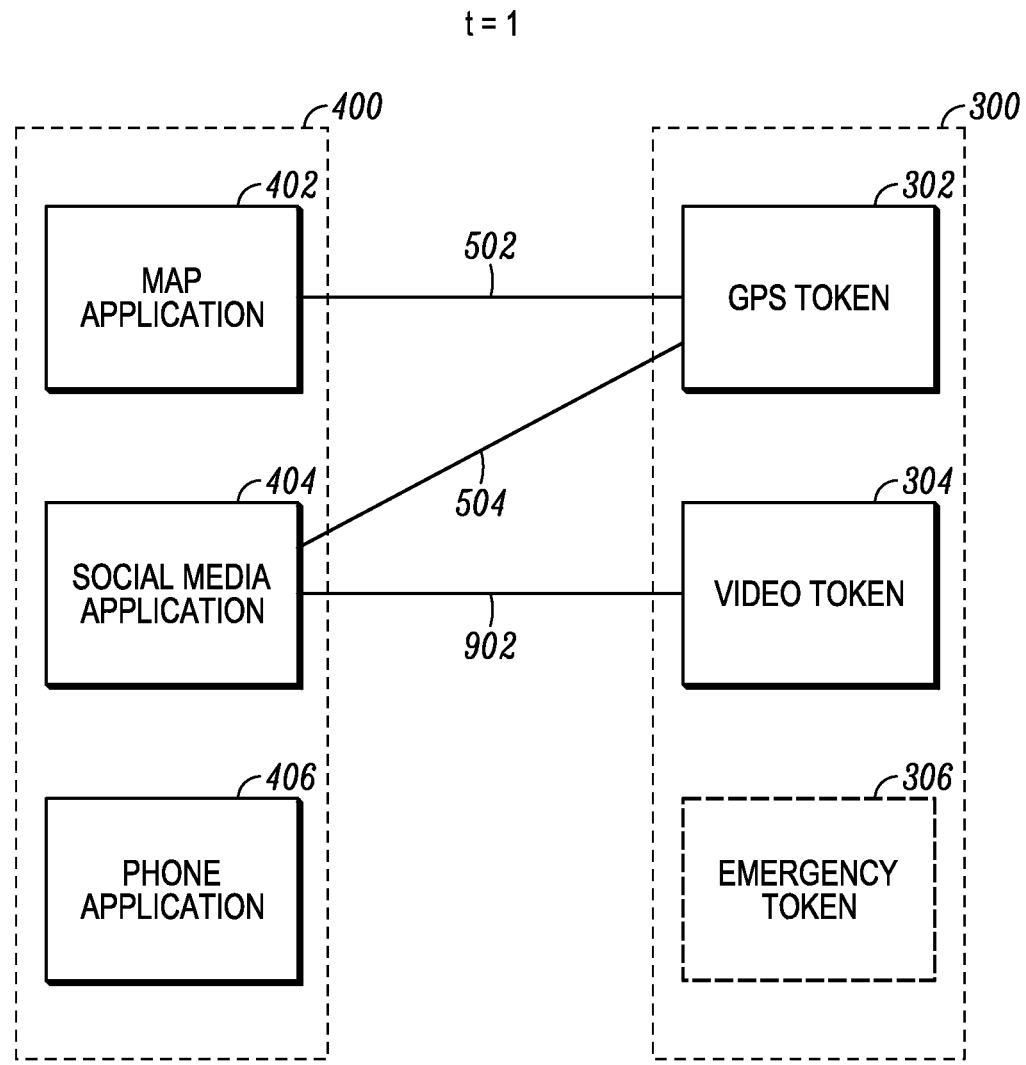
FIG. 9 is a block diagram identifying applications that are authorized to access given tokens at an example second time instance, in accordance with various embodiments.

FIG. 9 is a block diagram identifying the respective applications that are authorized to access the respective tokens in the token pool 300 at a second time instance (t=1), subsequent to the computing device 200 having communicated the allow action 814 to the social media application 404. As depicted, the map application 402 and the social media application 404 remain authorized to access the GPS token 302. As indicated by the solid line 902 in FIG. 9, the social media application 404 has since been authorized to access the video token 304, and the video token 304 has been toggled from being in the inactive state to being in the active state. As depicted in FIG. 9, in at least one embodiment, more than one application can, at a given moment in time, be authorized to access a respective token. And as is also depicted in FIG. 9, in at least one embodiment, a respective application can, at a given moment in time, be authorized to access more than one token.

Figure 12:
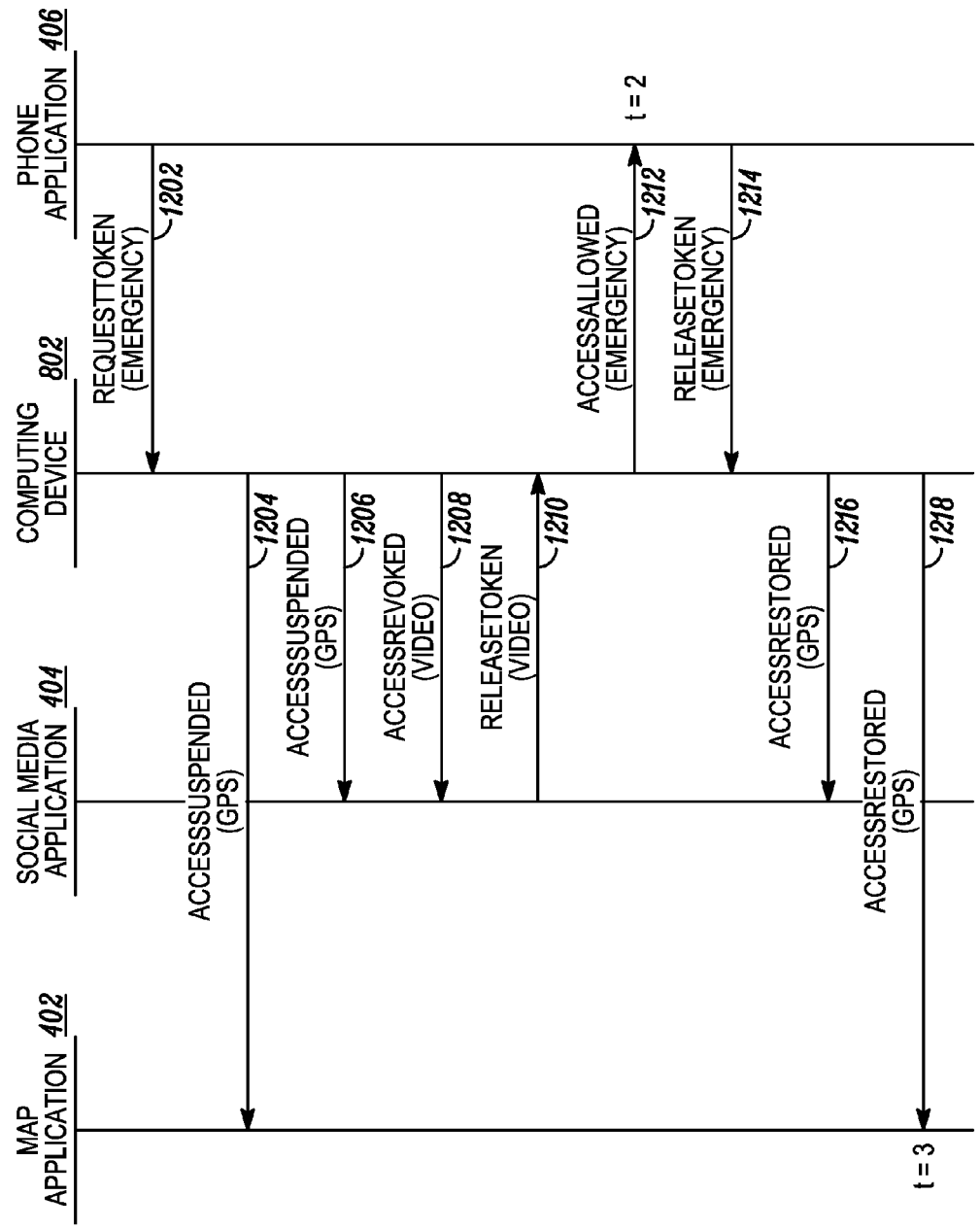
FIG. 12 depicts an example communication between a computing device and several respective applications, in accordance with various embodiments.

FIG. 12 depicts an example communication between the computing device 200 and respective applications 402, 404, and 406, in accordance with various embodiments. As shown, in the depicted example, subsequent to the second time (t=1), computing device 200 receives, from phone application 406, a token request 1202 that identifies the emergency token 306 as the requested token. Computing device 200 responsively identifies the one or more token-interaction directives for which the triggering token is the requested emergency token 306 and for which the target token is active: in this case, those are the token-interaction directives 614 and 616.

Figure 10:
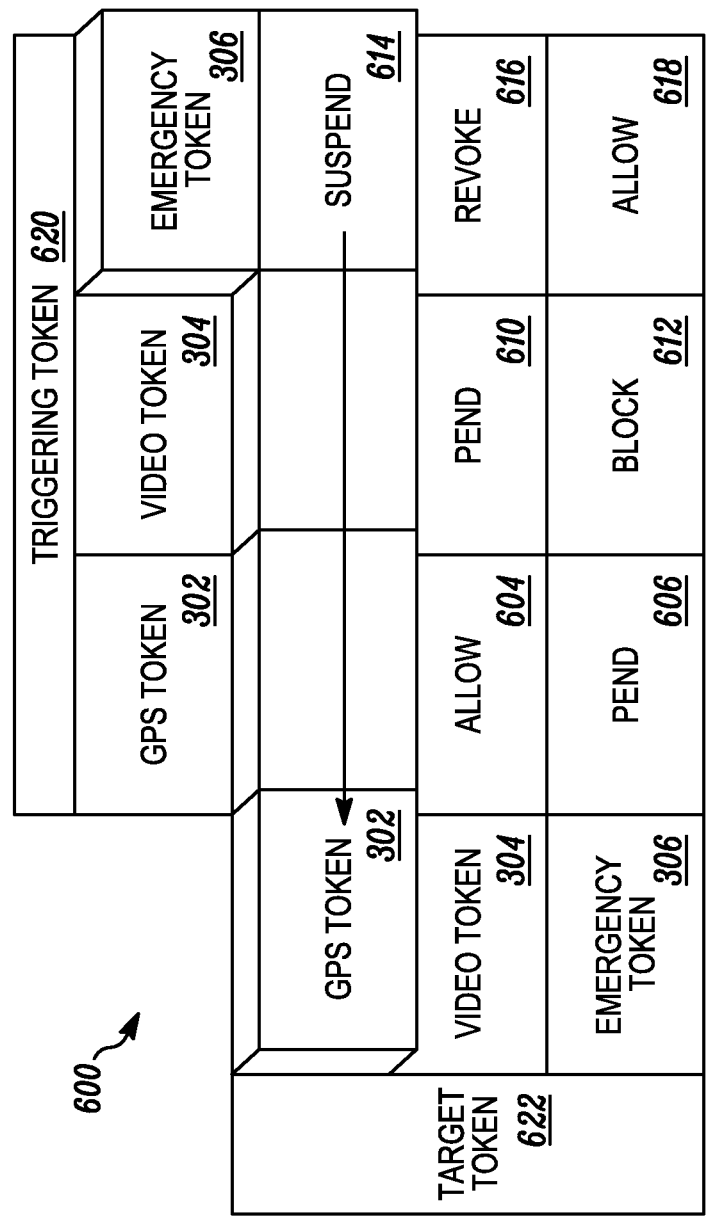
FIG. 10 depicts several example token-interaction directives, in accordance with various embodiments.
Figure 11:
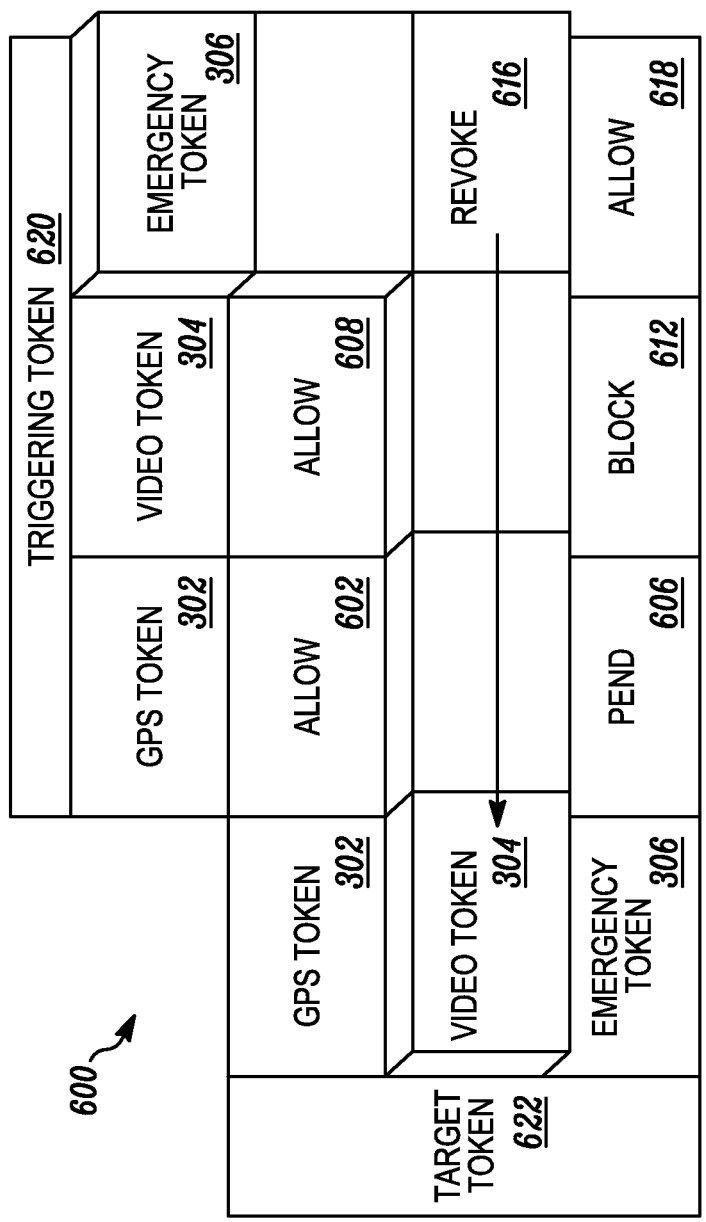
FIG. 11 depicts several example token-interaction directives, in accordance with various embodiments.

FIGS. 10 and 11 depict those identified token-interaction directives 614 and 616, which as stated are the only token-interaction directives for which the respective triggering token 620 is the emergency token 306 and for which the respective target token 622 (in this case, the GPS token 302 or the video token 304) is active (i.e., is in the active state). As shown in FIG. 10, in the depicted example, the token-interaction directive 614 specifies a suspend action to be taken with respect to the target GPS token 302, perhaps to preserve computing-device battery power while computing device 200 is in the emergency state (and perhaps also because GPS hardware is generally battery-power intensive), among many other possible motivations. And as shown in FIG. 11, in the depicted example, the token-interaction directive 616 specifies a revocation (i.e., kill) action to be taken with respect to the target video token 304, perhaps to eliminate the possibility of disruption while the computing device 200 is in the emergency state, again among many other possible motivations.

Accordingly, the computing device 200 responsively generates a response plan that in this example includes (i) the suspend actions 1204 and 1206 to be taken with respect to the (in this context, target) GPS token 302 and (ii) the revocation action 1208 to be taken with respect to the (in this context, target) video token 304. The computing device 200 communicates the "suspend (GPS)" actions 1204 and 1206 to the map application 402 and the social media application 404, respectively, and communicates the "revocation (video)" action 1208 to the social media application 404. The computing device 200 additionally changes the target GPS token 302 and the target video token 304 from the active state to the inactive state. The computing device 200 further communicates an allow action to the phone application 406 and changes the emergency token 306 from the inactive state to the active state.

Figure 13:
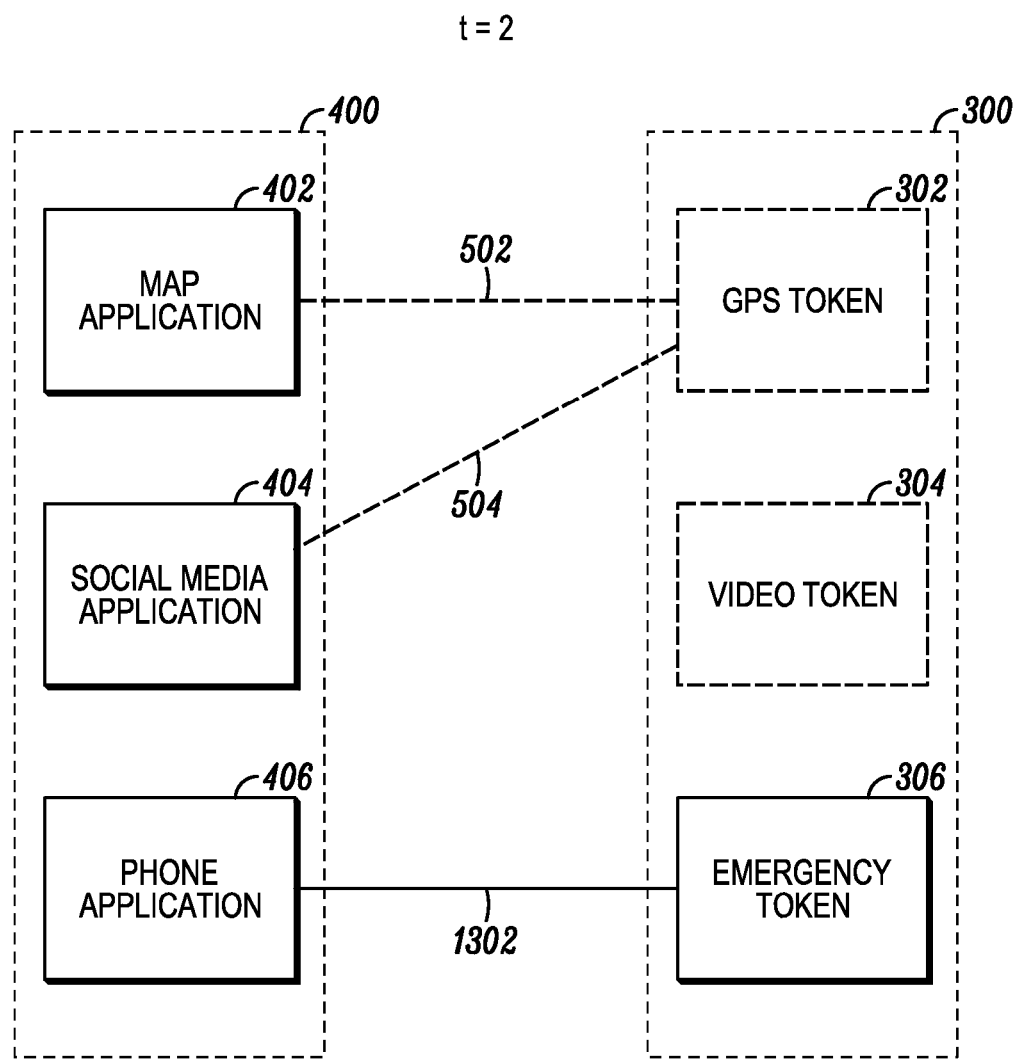
FIG. 13 is a block diagram identifying applications that are authorized to access given tokens at an example third time instance, in accordance with various embodiments.

FIG. 13 is a block diagram identifying the respective applications that are authorized to access respective tokens in the token pool 300 at a third time instance (t=2), subsequent to the computing device 200 communicating the actions 1204, 1206, and 1208. As depicted, in this example, access to GPS token 302 by map application 402 and by social media application 404 has been suspended as indicated by the now-dashed lines 502 and 504, respectively. Access to video token 304 by social media application 404 has been revoked, as indicated by the absence of a line between the application 404 and token 304. Both GPS token 302 and video token 304 have been changed from the active state to the inactive state, as indicated by their respective dashed borders. Additionally, phone application 406 has been authorized to access emergency token 306, as indicated by solid line 1302, and emergency token 306 has been changed from the inactive state to the active state, as indicated by the solid border of token 306.

As depicted in FIG. 12, the computing device 200 subsequently receives from phone application 406 an indication 1214 that the application is relinquishing access to the emergency token. The computing device 200 responsively communicates, to map application 402 and social media application 404, respective notices 1218 and 1216 of reauthorization to access the GPS token 302, and further changes the GPS token 302 from the inactive state to the active state.

Figure 14:
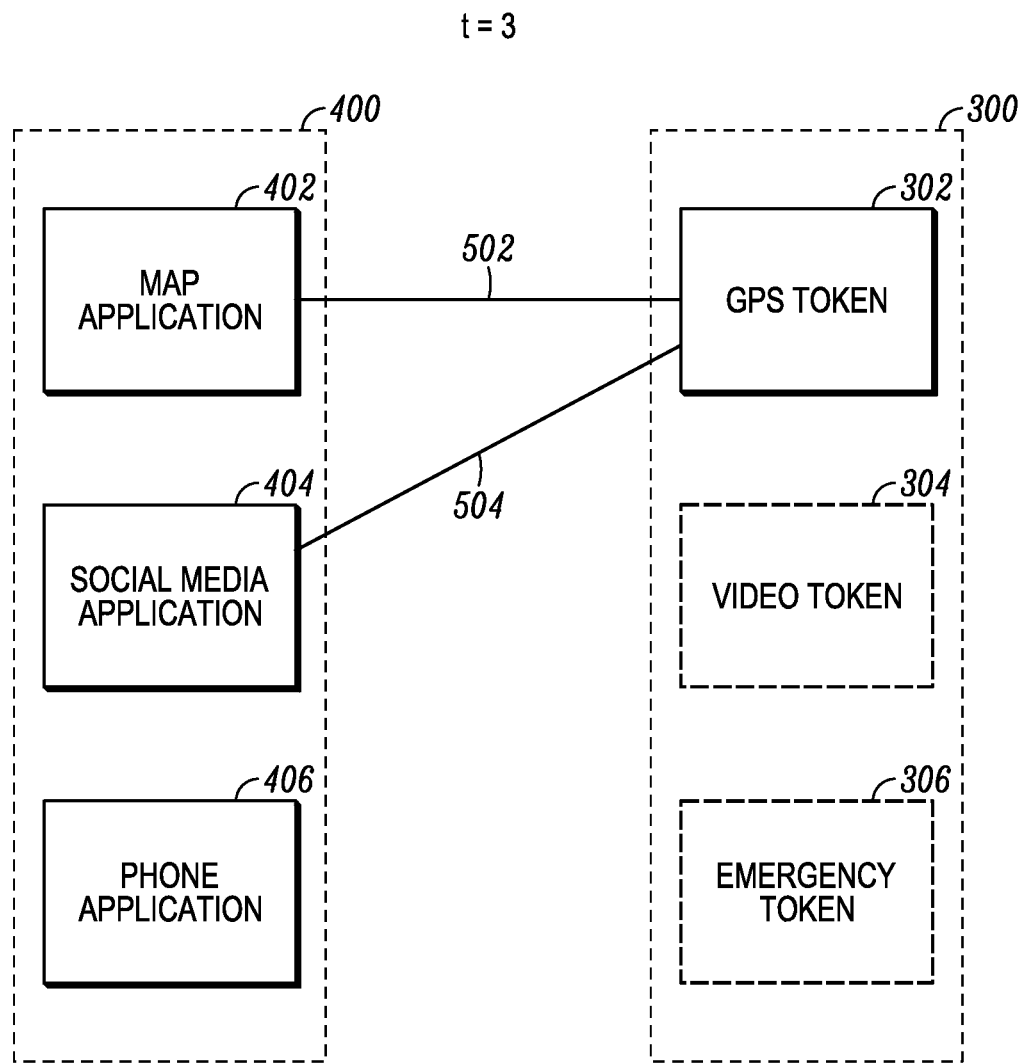
FIG. 14 is a block diagram identifying applications that are authorized to access given tokens at an example fourth time instance, in accordance with various embodiments.

FIG. 14 is a block diagram identifying the respective applications that are authorized to access respective tokens in the token pool 300 at a fourth time instance (t=3), subsequent to the computing device 200 communicating the notices 1216 and 1218. As depicted, access to the GPS token 302 by the map application 402 and social media application 404 has been restored, as indicated by the solid lines 502 and 504, respectively. Access to emergency token 306 by the phone application 406 has been relinquished, as indicated by the absence of a line between application 406 and token 306. Furthermore, the emergency token 306 has been changed from the active state to the inactive state, and the GPS token 302 has been changed from the inactive state to the active state. And certainly many other example token interactions could be described in accordance with the present systems and methods, as the examples that are described herein are presented by way of illustration and not limitation.

III. Conclusion

In the foregoing specification, specific embodiments have been described. However, one of ordinary skill in the art appreciates that various modifications and changes can be made without departing from the scope of the invention as set forth in the claims below. Accordingly, the specification and figures are to be regarded in an depictive rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises a", "has a", "includes a", "contains a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. A method comprising:
receiving, from respective applications among a plurality of applications, token requests that each identify a respective requested token from a pool of tokens that are each togglable between:
(i) an active state in which one or more of the applications are authorized to access the token, and
(ii) an inactive state in which none of the applications are authorized to access the token;
maintaining in data storage a token-interaction-directive pool comprising a plurality of token-interaction directives, each token-interaction directive specifying:
(i) a triggering token for that token-interaction directive,
(ii) a target token for that token-interaction directive, and
(iii) one or both of:
(a) one or more actions that are to be taken with respect to the triggering token for that token-interaction directive, and
(b) one or more actions that are to be taken with respect to the target token for that token-interaction directive;
responsive to receiving a given token request from a given application, identifying the one or more token-interaction directives for which:
(i) the triggering token is the requested token that is identified by the given token request, and
(ii) the target token is active;
generating a response plan comprising the actions included in the identified one or more token-interaction directives;
communicating each action in the response plan that is to be taken with respect to the triggering token for the corresponding token-interaction directive to the given application; and
communicating each action in the response plan that is to be taken with respect to the target token for the corresponding token-interaction directive to each application that is authorized to access that target token; and
wherein the response plan includes a pend action that is to be taken with respect to the triggering token for the corresponding token-interaction directive, said pend action placing the given application in a pending state of waiting for authorization to access the requested token.
2. The method of claim 1, wherein at least one token in the pool of tokens represents an application.
3. The method of claim 1, wherein at least one token in the pool of tokens represents an application state.
4. The method of claim 1, wherein at least one token in the pool of tokens represents a group of applications.
5. The method of claim 1, wherein at least one token in the pool of tokens represents a device state.
6. The method of claim 1, wherein one or more of the token-interaction directives in the token-interaction-directive pool are configurable.
7. The method of claim 1, wherein the response plan includes an allow action that is to be taken with respect to the triggering token for the corresponding token-interaction directive, said allow action allowing the given application to access the requested token.
8. The method of claim 7, further comprising changing the triggering token in the corresponding token-interaction directive from the inactive state to the active state.
9. The method of claim 1, wherein the response plan includes a block action that is to be taken with respect to the triggering token for the corresponding token-interaction directive, said block action blocking the given application from accessing the requested token.

10. The method of claim 1 further comprising communicating to the given application notice of authorization to access the requested token.

11. The method of claim 10, further comprising changing the triggering token in the corresponding token-interaction directive from the inactive state to the active state.

12. The method of claim 1, wherein the response plan includes a revocation action that is to be taken with respect to the target token for the corresponding token-interaction directive, said revocation action transitioning one or more applications that at that time were authorized to access the target token into a state of not being authorized to access the target token.

13. The method of claim 1, wherein the response plan includes a suspend action that is to be taken with respect to the target token for the corresponding token-interaction directive, said suspend action placing one or more applications that at that time were authorized to access the target token in a suspended state of (i) not being authorized to access the target token and (ii) waiting for reauthorization to access the target token.

14. The method of claim 13, further comprising changing the target token in each of the one or more corresponding token-interaction directives from the active state to the inactive state.

15. The method of claim 13, further comprising communicating to each of the one or more applications notice of reauthorization to access the target token.

16. The method of claim 15, further comprising changing the target token in each of the one or more corresponding token-interaction directives from the inactive state to the active state.

17. The method of claim 1, wherein the response plan includes at least one action selected based at least in part on a priority level associated with one or more token requests.

18. The method of claim 1,
wherein one or more of the applications are token-unaware applications;
wherein receiving token requests from at least one token-unaware application comprises receiving token requests from the at least one token-unaware application via a proxy;
wherein communicating actions to the at least one token-unaware application comprises communicating actions to the at least one token-unaware application via the proxy; and
wherein the proxy translates between a token-aware application programming interface (API) and an API supported by the at least one token-unaware application.

19. A method comprising:
receiving, from respective applications among a plurality of applications, token requests that each identify a respective requested token from a pool of tokens that are each togglable between:
(i) an active state in which one or more of the applications are authorized to access the token, and
(ii) an inactive state in which none of the applications are authorized to access the token;
maintaining in data storage a token-interaction-directive pool comprising a plurality of token-interaction directives, each token-interaction directive specifying:
a triggering token for that token-interaction directive,
(ii) a target token for that token-interaction directive, and
(iii) one or both of:
(a) one or more actions that are to be taken with respect to the triggering token for that token-interaction directive, and
(b) one or more actions that are to be taken with respect to the target token for that token-interaction directive;
responsive to receiving a given token request from a given application, identifying the one or more token-interaction directives for which:
(i)the triggering token is the requested token that is identified by the given token request, and
(ii) the target token is active;
generating a response plan comprising the actions included in the identified one or more token-interaction directives;
communicating each action in the response plan that is to be taken with respect to the triggering token for the corresponding token-interaction directive to the given application; and
communicating each action in the response plan that is to be taken with respect to the target token for the corresponding token-interaction directive to each application that is authorized to access that target token; and
wherein the response plan includes a revocation action that is to be taken with respect to the target token for the corresponding token-interaction directive, said revocation action transitioning one or more applications that at that time were authorized to access the target token into a state of not being authorized to access the target token.

20. A method comprising:
receiving, from respective applications among a plurality of applications, token requests that each identify a respective requested token from a pool of tokens that are each togglable between:
(i) an active state in which one or more of the applications are authorized to access the token, and
(ii) an inactive state in which none of the applications are authorized to access the token;
maintaining in data storage a token-interaction-directive pool comprising a plurality of token-interaction directives, each token-interaction directive specifying:
(i) a triggering token for that token-interaction directive,
(ii) a target token for that token-interaction directive, and
(iii) one or both of:
(a) one or more actions that are to be taken with respect to the triggering token for that token-interaction directive, and
(b) one or more actions that are to be taken with respect to the target token for that token-interaction directive;
responsive to receiving a given token request from a given application, identifying the one or more token-interaction directives for which:
(i) the triggering token is the requested token that is identified by the given token request, and
(ii) the target token is active;
generating a response plan comprising the actions included in the identified one or more token-interaction directives;
communicating each action in the response plan that is to be taken with respect to the triggering token for the corresponding token-interaction directive to the given application; and
communicating each action in the response plan that is to be taken with respect to the target token for the corresponding token-interaction directive to each application that is authorized to access that target token;
wherein the response plan includes a suspend action that is to be taken with respect to the target token for the corresponding token-interaction directive, said suspend action placing one or more applications that at that time were authorized to access the target token in a suspended state of (i) not being authorized to access the target token and (ii) waiting for reauthorization to access the target token.

\* \* \* \* \*